(No Model.)
J. RIGBY.
Car Wheel.
No. 233,701. Patented Oct. 26, 1880.
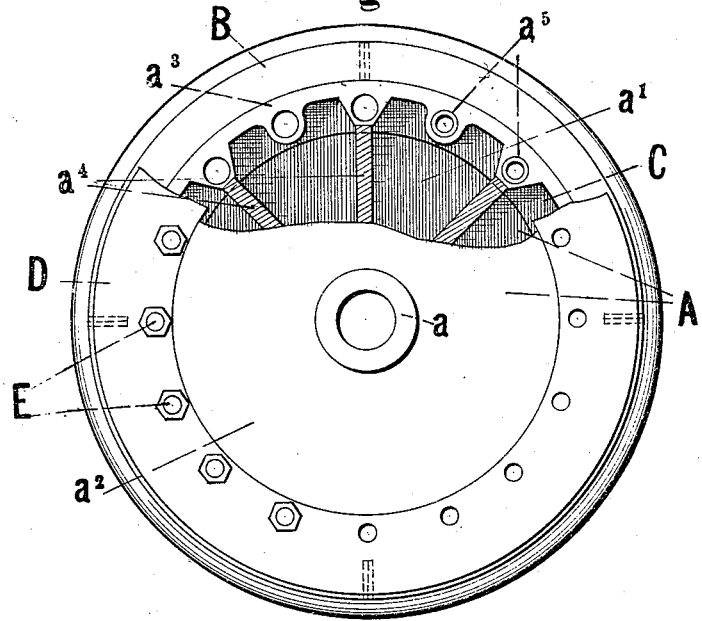
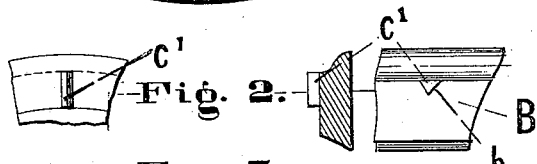
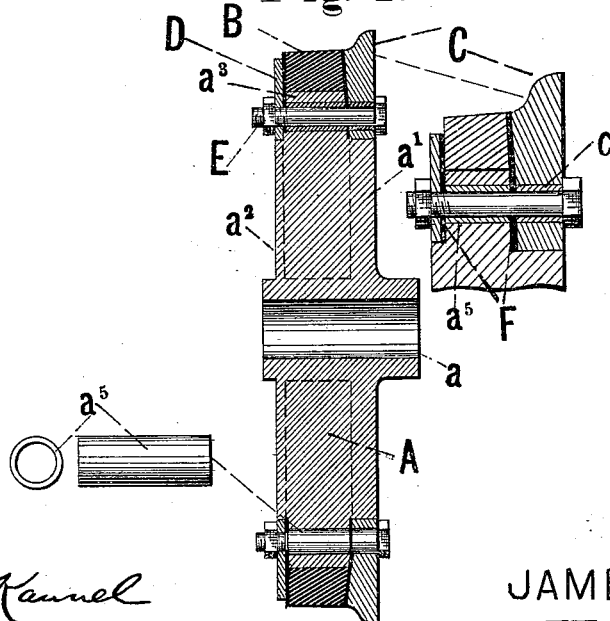
WITNESSES:
S. Van Kannel
V. L. West
INVENTOR:
JAMES RIGBY,
BY
H. W. Beadle + Co.
ATTYS.

UNITED STATES PATENT OFFICE.

JAMES RIGBY, OF MONTREAL, QUEBEC, CANADA.

CAR-WHEEL.

SPECIFICATION forming part of Letters Patent No. 233,701, dated October 26, 1880.

Application filed March 15, 1880. (No model.)

*To all whom it may concern:*

Be it known that I, JAMES RIGBY, of the city of Montreal, Province of Quebec, and Dominion of Canada, have invented new and useful Improvements in Car-Wheels; and I do hereby declare the following to be a full, clear, and exact description of the same, reference being had to the accompanying drawings and the letters of reference marked thereon.

This invention consists, mainly, in the combination of a car-wheel body of suitable construction with an independent removable tire and an independent removable flange.

It consists, further, in certain details of construction, which, in connection with the foregoing, will be fully described hereinafter.

In the drawings, Figure 1 represents a side elevation of my improved wheel with a portion of the outer face broken away to show the interior construction; Fig. 2, detail views, representing the projection upon the inner face of the flange-ring; Fig. 3, a central vertical sectional elevation with detail views enlarged.

To enable others skilled in the art to make my improved wheel, I will proceed to describe fully the construction of the same.

A represents the car-wheel body, consisting, preferably, of a hub portion, $a$, a plate portion, $a'$, upon the inner side of the wheel, a plate portion, $a^2$, upon the outer side of the wheel, and a peripheral bearing portion, $a^3$, having the straight spokes $a^4$, uniting the same to the hub. The entire body, with its hub portion, plate portions, and peripheral bearing portion, is cast in one piece.

$a^5$ $a^5$ represent pieces of pipe embodied in the metal, the latter having been cast around them, which are employed for the purpose of facilitating the manufacture of the wheel.

B represents an independent tire, the cross-section of which is a true rectangle, with the exception that the inner side of the same is so inclined as to make the inner face of the tire wider than its outer face, as shown in Fig. 3, for purposes hereinafter explained. This tire is adapted to fit the peripheral bearing portion $a^3$ of the wheel-body, as shown.

$b$, Fig. 2, represents a recess formed in the outer face of the tire, the purpose of which will be hereinafter explained.

C represents an independent flange-ring having pieces of pipe $c$ embodied in the metal, as shown, the position of which pipes corresponds exactly with the position of the pipes $a^5$ in the wheel-body A. This flange is adapted to fit a proper recess in the wheel-body, and is provided upon its inner face with an inclined side corresponding with the inclined side of the tire, as shown.

$c'$, Fig. 2, represents one or more projections upon the inner face of the flange-ring, which are adapted to fit correspondingly-formed recesses in the tire. One of these projections may be made different in form from the others, for the purpose of making it impossible to unite the flange to the tire in any other position than the proper one.

D represents a clamping-ring adapted to rest in a proper recess on the outer side of the wheel, as shown.

E E represent securing-bolts extending through the pipes in the flange-ring and wheel-body, and through proper openings in the clamping-ring, as shown. By means of these bolts the parts of the wheel are all strongly secured together.

F represents a ring, of rubber or any other suitable material, which is employed for the purpose of providing for the expansion and contraction of the bolts. Each part of this wheel is to be made according to a fixed standard, in order that it may be used indiscriminately with other proper parts to form a wheel.

Some of the advantages of the described construction are as follows: The parts of the wheel being interchangeable, it is possible, when either a flange or a tire becomes worn, to replace the same by a new one. Because the flange and tire are independent of the body also, it is possible to make them of steel, while the body is made of cast-iron. The body of the wheel also being cast without the tire and flange, no great amount of metal is located at the circumference of the wheel, and hence in cooling the same is permitted to shrink uniformly from the circumference to the center, in consequence of which the body is without the usual tension and strain which are incidental to the manufacture of car-wheels in the ordinary way.

In casting car-wheels with the body, tire, and flange all in one piece great difficulties occur from the unequal cooling of the parts. These difficulties are entirely obviated by means of my invention.

By constructing the tire and flange-ring with the inclined surfaces described the former is strongly held under all circumstances, and even if broken cannot escape from the recess in which it is held.

I am aware that a car-wheel has been before made with an independent flange-ring, clamping-ring, and tire upon a central body portion; but the body portion was formed of wood and the tire of india-rubber.

I am also aware that a car-wheel has been before made with an independent flange-ring and tire upon a central body portion, the parts being of metal; but the clamping-ring in this case was wanting.

Having thus fully described my improved wheel, what I claim as new, and desire to secure by Letters Patent, is—

1. As a new article of manufacture, a car-wheel having the metal wheel-body A, the independent removable tire B, the independent removable steel flange-ring C, the clamping-ring D, and the removable securing-bolts E, the construction being such that the non-elastic tire is securely clamped between the rings by the bolts, substantially as described.

2. In combination with the body A, having the plate portions $a'$ $a^2$, peripheral bearing portion $a^3$, and spokes $a^4$, the tire B, flange-ring C, clamping-ring D, and bolts E, as described.

3. In combination with the body A, having the pipes $a^5$, the flange-ring C, having the pipes $c$, as described.

4. In combination with the body A, having the plate portions $a'$ $a^2$, peripheral bearing portion $a^3$, and spokes $a^4$, the tire B, flange-ring C, packing F, clamping-ring D, and bolts E, as described.

This specification signed and witnessed this 15th day of March, 1880.

JAMES RIGBY.

Witnesses:
T. VAN KANNEL,
A. B. BEADLE.